(12) United States Patent  (10) Patent No.: US 8,654,506 B2
Kawamoto  (45) Date of Patent: Feb. 18, 2014

(54) LAMINATE TYPE SEMICONDUCTOR CERAMIC CAPACITOR WITH VARISTOR FUNCTION

(75) Inventor: Mitsutoshi Kawamoto, Nagaokakyo (JP)

(73) Assignee: Murata Manufacturing Co., Ltd., Nagaokakyo-Shi Kyoto-Fu (JP)

( * ) Notice: Subject to any disclaimer, the term of this patent is extended or adjusted under 35 U.S.C. 154(b) by 199 days.

(21) Appl. No.: 13/187,052

(22) Filed: Jul. 20, 2011

(65) Prior Publication Data
US 2012/0019977 A1  Jan. 26, 2012

(30) Foreign Application Priority Data
Jul. 23, 2010 (JP) ................................. 2010-165976

(51) Int. Cl.
*H01G 4/06* (2006.01)

(52) U.S. Cl.
USPC ..................... 361/321.4; 361/321.5

(58) Field of Classification Search
USPC ............................................ 361/321.1–321.5
See application file for complete search history.

(56) References Cited

U.S. PATENT DOCUMENTS

| | | | |
|---|---|---|---|
| 5,166,759 A | 11/1992 | Ueno et al. | |
| 5,166,859 A | 11/1992 | Ueno et al. | |
| 5,268,006 A | 12/1993 | Ueno et al. | |
| 7,583,493 B2 | 9/2009 | Tani et al. | |
| 7,872,854 B2 | 1/2011 | Kawamoto | |
| 2002/0197793 A1 | 12/2002 | Dornfest et al. | |
| 2003/0020157 A1 | 1/2003 | Natori et al. | |
| 2003/0096125 A1 | 5/2003 | Ogasawara et al. | |
| 2003/0137797 A1 | 7/2003 | Kimoto et al. | |
| 2003/0147194 A1 | 8/2003 | Hibi et al. | |
| 2005/0128683 A1 | 6/2005 | Watanabe et al. | |
| 2008/0186655 A1* | 8/2008 | Kawamoto | 361/321.4 |
| 2008/0248286 A1* | 10/2008 | Kawamoto et al. | 428/325 |
| 2010/0103587 A1* | 4/2010 | Kawamoto | 361/321.1 |

FOREIGN PATENT DOCUMENTS

| | | |
|---|---|---|
| CN | 101346325 A | 1/2009 |
| EP | 0548394 A1 | 6/1993 |
| JP | 57-64918 A | 4/1982 |
| JP | 57-207323 A | 12/1982 |
| JP | 2-240904 A | 9/1990 |
| JP | 03-060006 A | 3/1991 |

(Continued)

OTHER PUBLICATIONS

Written Opinion of the International Searching Authority, mailed Aug. 28, 2007.

(Continued)

*Primary Examiner* — Eric Thomas
(74) *Attorney, Agent, or Firm* — Dickstein Shapiro LLP (57) ABSTRACT

A laminate type semiconductor ceramic capacitor with a varistor function is achieved which allows for an improvement in product yield while ensuring such insulation performance that can withstand practical use, and is suitable for mass production with a favorable ESD withstanding voltage. The semiconductor ceramic forming the semiconductor ceramic layers has a compounding molar ratio m between the Sr site and the Ti site of $0.990 \le m < 1.000$, has a donor element such as La present as a solid solution in crystal grains, has an acceptor element such as Mn present in a grain boundary layer in the range of 0.5 mol or less (preferably 0.3 mol to 0.5 mol) with respect to 100 mol of the Ti element, and has the crystal grains with an average grain size of 1.5 μm or less.

20 Claims, 3 Drawing Sheets

(56) References Cited

FOREIGN PATENT DOCUMENTS

| JP | 04-251908 A | 9/1992 |
| JP | 11-302072 A | 11/1999 |
| WO | WO-2007/139061 A1 | 12/2007 |
| WO | WO-2008/004389 A1 | 1/2008 |

OTHER PUBLICATIONS

Supplementary European Search Report, mailed Jan. 19, 2011.
Japanese Office Action issued for corresponding Japanese Appl No. 2010-165976, date of dispatch Nov. 20, 2012 (with English translation).

* cited by examiner

LAMINATE TYPE SEMICONDUCTOR CERAMIC CAPACITOR WITH VARISTOR FUNCTION

BACKGROUND OF THE INVENTION

1. Field of the Invention

The present invention relates to a laminate type semiconductor ceramic capacitor with a varistor function, and more particularly, relates to a laminate type semiconductor ceramic capacitor with a varistor function, which uses a $SrTiO_3$ based grain boundary insulated semiconductor ceramic.

2. Description of the Related Art

In recent years, mobile electronic devices such as cellular phones and laptop personal computer, and in-car electronic devices to be installed on cars have become common, and as with the development of electronics technology, a reduction in size with multiple functions has been required for the electronic devices.

In order to achieve the reduction in size with multiple functions for the electronic devices, more semiconductor elements have been used such as various types of ICs and LSI, and consequently, the electronic devices have been losing their noise immunity.

Conventionally, power lines for various types of ICs and LSI are provided with a film capacitor, a laminate type ceramic capacitor, a semiconductor ceramic capacitor, or the like as a bypass capacitor, to thereby ensure the noise immunity for the electronic devices.

In particular, it is commonly the case in car navigation systems, car audio systems, in-car ECUs, etc., that a capacitor with a capacitance on the order of 1 nF is connected to an external terminal, to thereby absorb high-frequency noises.

However, while these capacitors deliver superior performance on the absorption of high-frequency noises, the capacitors themselves do not function to absorb high-voltage pulses or static electricity. For this reason, there is a possibility that if the high-voltage pulses or static electricity are input to the electronic devices, they may cause the electronic device to malfunction or cause the semiconductor elements to be broken. In particular, a lowered capacitance on the order of 1 nF makes the ESD (Electro-Static Discharge) withstanding voltage extremely low (for example, on the order of 2 kV to 4 kV), thereby possibly leading to breakdown of the capacitor itself.

Figure 2A:
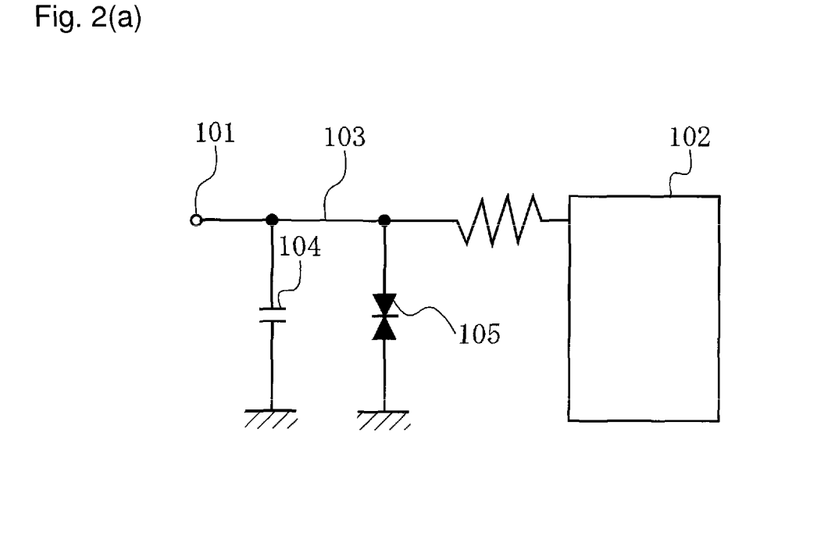
FIGS. 2(a) and 2(b) are electric circuit diagrams in the case of a zener diode or a varistor provided in parallel to a capacitor.
Figure 2B:
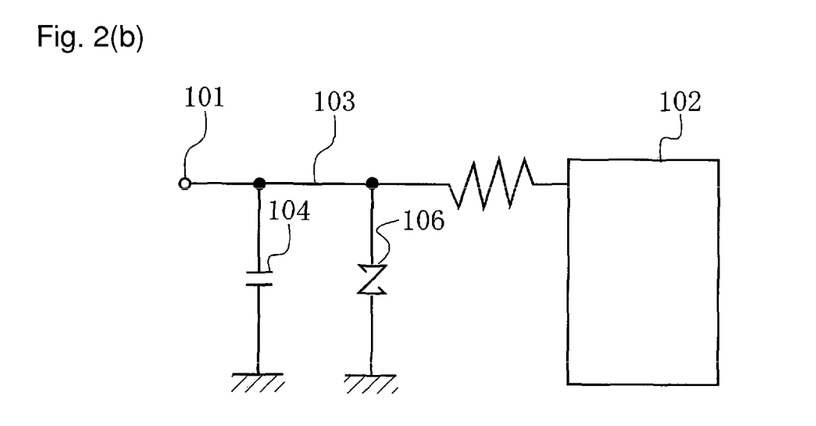

Conventionally, as shown in FIG. 2(a), a zener diode 105 is provided in parallel to a capacitor 104 connected to a power line 103 for connecting an external terminal 101 and an IC 102, or as shown in FIG. 2(b), a varistor 106 is provided in parallel to the capacitor 104, thereby ensuring an ESD withstanding voltage.

However, when the zener diode 105 or the varistor 106 is provided in parallel to the capacitor 104 as described above, the number of components is increased to cause an increase in cost. Moreover, a space for the placement of the components has to be ensured, and there is thus a possibility that an increase in the size of the device may result.

Figure 3:
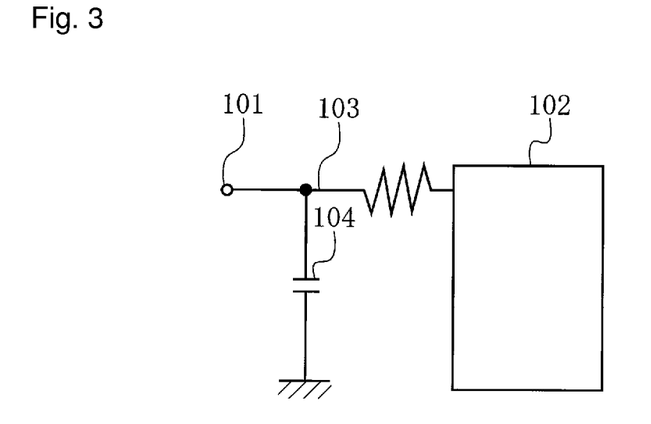
FIG. 3 is an electric circuit diagram in the case of a capacitor with a varistor function.

If the capacitor had a varistor function, the need for the zener diode or the varistor will be eliminated, and the ESD withstanding voltage can also be handled by only the capacitor as shown in FIG. 3, thereby making it easier to standardize the design, and thus allowing a value-added capacitor to be provided.

International Publication WO2008/004389 proposes a laminate type semiconductor ceramic capacitor with a varistor function in which a semiconductor ceramic is formed of a $SrTiO_3$ based grain boundary insulated type, the compounding molar ratio m between the Sr site and the Ti site satisfying $1.00<m\leq1.020$, a donor element is present as a solid solution in crystal grains, an acceptor element is present in a grain boundary layer in the range of 0.5 mol or less (excluding 0 mol) with respect to 100 mol of the Ti element, and the crystal grains have an average grain size of 1.0 μm or less.

According to the International Publication WO2008/004389, the semiconductor ceramic which has the composition described above allows a laminate type grain boundary insulated semiconductor ceramic capacitor with a varistor function to be achieved which provides favorable insulation properties, has a favorable ESD withstanding voltage, and allows the reduction in layer thickness and the reduction in size.

SUMMARY OF THE INVENTION

However, while the laminate type semiconductor ceramic capacitor with a varistor function in the International Publication WO2008/004389 has an ESD withstanding voltage of 30 kV or more and favorable insulation properties with a specific resistance log ρ of 9.7, the capacitor has a problem that a lowered capacitance on the order of 1 nF causes great variability in insulation performance, thereby resulting in a decrease in product yield, and thus in inferior productivity.

The present invention has been made in view of these circumstances, and an object of the present invention is to provide a laminate type semiconductor ceramic capacitor with a varistor function, which allows for an improvement in product yield while ensuring such insulation performance that can withstand practical use, and is suitable for mass production with a favorable ESD withstanding voltage.

The present inventor has carried out earnest research on $SrTiO_3$ based grain boundary insulated semiconductor ceramics in order to achieve the object, and has found that when the compounding molar ratio between the Sr site and the Ti site is adjusted so that a predetermined amount of Ti site is excessively present over a stoichiometric composition, an improvement in product yield can be achieved while ensuring such insulation performance that can withstand practical use, and a favorable ESD withstanding voltage can be achieved.

The present invention has been made on the basis of this finding, and a laminate type semiconductor ceramic capacitor with a varistor function (hereinafter, simply referred to as a "laminate type semiconductor ceramic capacitor") according to the present invention includes: a laminated sintered body obtained by alternately stacking and firing a plurality of semiconductor ceramic layers formed from a $SrTiO_3$ based grain boundary insulated semiconductor ceramic and a plurality of internal electrode layers; and external electrodes on both ends of the laminated sintered body, the external electrodes electrically connected to the internal electrode layers, and in the laminate type semiconductor ceramic capacitor, the semiconductor ceramic characteristically has a compounding molar ratio m between the Sr site and the Ti site which satisfies $0.990\leq m<1.000$, has a donor element present as a solid solution in crystal grains, has an acceptor element present in a grain boundary layer in the range of 0.5 mol or less (excluding 0 mol) with respect to 100 mol of the Ti element, and has crystal grains with an average grain size of 1.5 μm or less.

In order to ensure more favorable electrical properties and insulation properties while ensuring a desired ESD withstanding voltage, the acceptor element is preferably contained in the range of 0.3 mol to 0.5 mol with respect to 100 mol of the Ti element.

More specifically, the laminate type semiconductor ceramic capacitor according to the present invention preferably contains the acceptor element in the range of 0.3 mol to 0.5 mol with respect to 100 mol of the Ti element.

In addition, the laminate type semiconductor ceramic capacitor according to the present invention has the acceptor element preferably containing at least one of Mn, Co, Ni, and Cr.

In addition, the laminate type semiconductor ceramic capacitor according to the present invention has the donor element preferably containing at least one of La, Nd, Sm, Dy, Nb, and Ta.

In addition, the laminate type semiconductor ceramic capacitor according to the present invention preferably contains a low melting point oxide in the range of 0.1 mol or less with respect to 100 mol of the Ti element.

Furthermore, the low melting point oxide preferably includes $SiO_2$ in the laminate type semiconductor ceramic capacitor according to the present invention.

In the laminate type semiconductor ceramic capacitor according to the present invention, the semiconductor ceramic forming the semiconductor ceramic layers has a compounding molar ratio m between the Sr site and the Ti site satisfying $0.990 \leq m < 1.000$, has a donor element such as La present as a solid solution in the crystal grains, has an acceptor element such as Mn present in the grain boundary layer in the range of 0.5 mol or less (preferably 0.3 mol to 0.5 mol) with respect to 100 mol of the Ti element, and has the crystal grains with an average grain size of 1.5 µm or less. This semiconductor ceramic allows a laminate type semiconductor ceramic capacitor with a varistor function to be achieved which is able to ensure such insulation performance that can withstand practical use adequately, allows for an improvement in product yield, and moreover is suitable for mass production with a favorable ESD withstanding voltage.

Specifically, the present invention allows a laminate type semiconductor ceramic capacitor to be achieved which has an ESD withstanding voltage of 30 kV or more, can ensure an insulation resistance log IR of 8.0 or more, has a product yield of 85% or more, and is suitable for mass production with favorable reliability, even when the capacitance is lowered to on the order of 1 nF.

DETAILED DESCRIPTION OF THE INVENTION

Next, an embodiment of the present invention will be described in detail.

Figure 1:
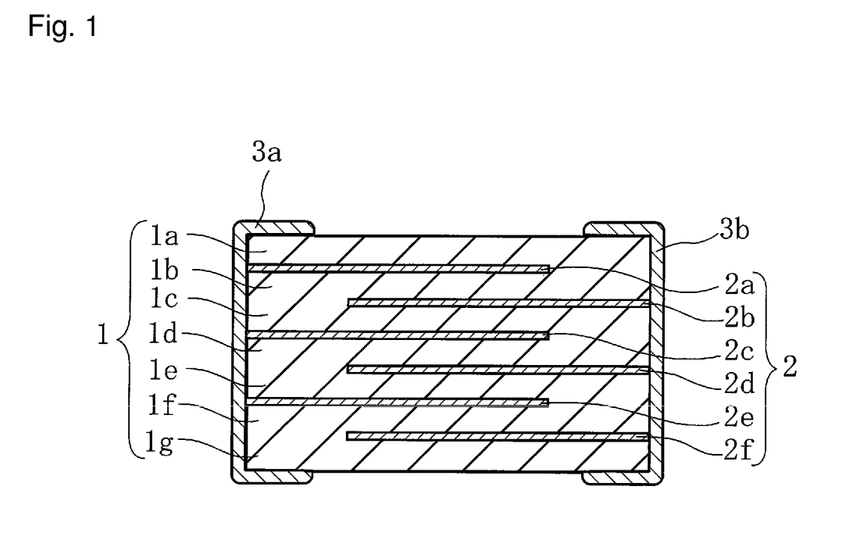
FIG. 1 is a cross-sectional view schematically illustrating an embodiment of a laminate type semiconductor ceramic capacitor according to the present invention.

FIG. 1 is a cross-sectional view schematically illustrating an embodiment of a laminate type semiconductor ceramic capacitor according to the present invention.

The laminate type semiconductor ceramic capacitor includes a component body 1 and external electrodes 3a and 3b formed on both ends of the component body 1.

The component body 1 is composed of a laminated sintered body with a plurality of semiconductor ceramic layers 1a to 1g and a plurality of internal electrode layers 2a to 2f stacked alternately and subjected to firing. The internal electrode layers 2a, 2c, and 2e are exposed at one end surface of the component body 1 and electrically connected to the external electrodes 3a, whereas the other internal electrode layers 2b, 2d, and 2f are exposed at the other end surface of the component body 1 and electrically connected to the other external electrode 3b.

The semiconductor ceramic layers 1a to 1g are composed of a plurality of semiconductor crystal grains and a grain boundary layer formed around the crystal grains in the microscopic sense (not shown), and the crystal grains form capacitance with the grain boundary layer interposed therebetween. Furthermore, these crystal grains are connected in series with or in parallel to each other between the opposed surfaces of the internal electrode layers 2a, 2c, and 2e and of the internal electrode layers 2b, 2d, and 2f to provide a desired capacitance as a whole.

The semiconductor ceramic layers 1a to 1g described above are formed from a $SrTiO_3$ based grain boundary insulated semiconductor ceramic. Furthermore, the semiconductor ceramic has a compounding molar ratio m between Sr site and Ti site (=Sr site/Ti site) which satisfies $0.990 \leq m < 1.000$, has a donor element present as a solid solution in the crystal grains, has an acceptor element present in the grain boundary layer in the range of 0.5 mol or less (excluding 0 mol) with respect to 100 mol of the Ti element, and has the crystal grains with an average grain size of 1.5 µm or less.

This semiconductor ceramic allows a laminate type semiconductor ceramic capacitor with a varistor function to be achieved which is able to ensure such insulation performance that can withstand practical use adequately, allows for an improvement in product yield, and moreover is suitable for mass production with a favorable ESD withstanding voltage.

The compounding molar ratio m between the Sr site and the Ti site is controlled to satisfy $0.990 \leq m < 1.000$ for the following reasons.

As described in International Publication WO2008/004389, an excessive molar content of the Sr site over the stoichiometric composition (for example, a compounding molar ratio m satisfying $1.000 < m \leq 1.020$) allows the crystal grains to be prevented from coarsening, and allows the insulation resistance to be prevented from decreasing. More specifically, the excessive addition of Sr over the stoichiometric composition causes Sr to be deposited in the grain boundary layer, rather than present as a solid solution in the crystal grains, to suppress the grain growth, thereby providing fine crystal grains (for example, average grain size: 1.0 µm or less). Furthermore, these fine crystal grains are believed to make oxygen likely to reach the grain boundary layer to promote the formation of a Schottky barrier, thereby allowing the insulation resistance to be prevented from decreasing.

In the case of containing excessive Ti over the stoichiometric composition, it is generally believed that the Ti which fails to be present as a solid solution in the crystal grains is deposited in the grain boundary layer. The Ti thus deposited in the grain boundary layer forms a liquid phase along with the acceptor element segregated in the grain boundary layer to promote the excessive grain growth, thereby leading to a coarsening of the crystal grains. The coarsening of the crystal grains is believed to cause oxygen to fail to reach the grain boundary layer, thereby resulting in a decrease in insulation resistance.

However, the mass production of an article with a lowered capacitance on the order of 1 nF causes great variability in insulation performance among products, thereby resulting in a decrease in product yield, and thus in inferior productivity in the case of the excessive molar content of the Sr site over the stoichiometric composition as described above. This is believed to be because the excessive Sr somewhat interferes with insulation at the crystal grain boundaries.

In the case of the compounding molar ratio m satisfying $0.990 \leq m < 1.000$ so that the Ti site is slightly in excess relative to a stoichiometric composition, while slight coarsening of the crystal grains causes the insulation resistance to tend to decrease, it allows the average grain size for the crystal grains to be reduced to 1.5 µm or less, thus making it possible to ensure an insulation resistance that can withstand practical use adequately, and allows the product yield to be improved dramatically because of the absence of Sr at the crystal grain boundaries. Moreover, the ESD withstanding voltage can also be well maintained in this case.

Accordingly, in the present embodiment, the compounding molar ratio m satisfying $0.990 \leq m < 1.000$ improves the product yield to allow for an improvement in productivity.

It is to be noted that a compounding molar ratio m of less than 0.990 causes excessive coarsening of the average grain size for the crystal grains, thereby resulting in a significant decrease in insulation performance, and moreover, in a decrease in ESD withstanding voltage. Therefore, the compounding molar ratio m needs to be 0.990 or more in such a range such that the ceramic is rich in Ti site.

In addition, a donor element present as a solid solution in the crystal grains brings the ceramic into a semiconductor. More specifically, the donor element is present as a solid solution in the crystal grains in order to bring the ceramic into a semiconductor state by carrying out a firing treatment in a reducing atmosphere, and the content of the donor element is not particularly limited. However, when the donor element is less than 0.2 mol with respect to 100 mol of the Ti element, there is a possibility that the capacitance may be decreased excessively. On the other hand, when the donor element is greater than 1.2 mol with respect to 100 mol of the Ti element, there is a possibility that the allowable temperature range may be narrowed for the firing temperature.

Therefore, the molar content of the donor element is preferably 0.2 mol to 1.2 mol, and more preferably 0.4 mol to 1.0 mol with respect to 100 mol of the Ti element.

Furthermore, this donor element is not to be considered particularly limited in species, and for example, La, Nd, Sm, Dy, etc. can be used in the case of the donor element present as a solid solution at the Sr site, whereas Nb, Ta, etc. can be used in the case of the donor element present as a solid solution at the Ti site.

In addition, the molar content of the acceptor element is controlled to 0.5 mol or less (excluding 0 mol) with respect to 100 mol of the Ti element for the following reason.

The presence of the acceptor element in the grain boundary layer causes the grain boundary layer to form an electrically activated energy level (grain boundary level) to promote the formation of a Schottky barrier, thereby improving the insulation resistance, and thus allowing the achievement of a laminate type semiconductor ceramic capacitor which has favorable insulation properties.

On the other hand, while the formation of a Schottky barrier is promoted with increase in the molar content of the acceptor element in the grain boundary layer, a molar content greater than 0.5 mol with respect to 100 mol of the Ti element unfavorably leads to a decrease in ESD withstanding voltage.

Therefore, in the present embodiment, the molar content of the acceptor element is 0.5 mol or less (excluding 0 mol) with respect to 100 mol of the Ti element.

It is to be noted that in order to achieve a desired capacitance and favorable insulation properties (insulation resistance) while ensuring a desired ESD withstanding voltage, the acceptor element is preferably contained in the range of 0.3 mol to 0.5 mol with respect to 100 mol of the Ti element.

Furthermore, while this acceptor element is not to be considered particularly limited in species, Mn, Co, Ni, Cr, etc. can be used, and in particular, Mn is preferably used.

In addition, it is also preferable to add a low melting point oxide into the semiconductor ceramic in the range of 0.1 mol or less with respect to 100 mol of the Ti element, and the addition of this type of low melting point oxide can improve the sinterability, and promote the segregation of the acceptor element in the grain boundary layer.

It is to be noted the molar content of the low melting point oxide should fall within the range mentioned above, because a molar content greater than 0.1 mol with respect to 100 mol of the Ti element may possibly lead to an excessive decrease in capacitance, thereby resulting in a failure to achieve desired electrical characteristics.

In addition, the low melting point oxide is not to be considered particularly limited, $SiO_2$, glass ceramics containing B or an alkali metal element (such as K, Li, and Na), copper-tungsten salts, etc. can be used, and among these, $SiO_2$ is preferably used.

It is to be noted the average grain size for the crystal grains of the semiconductor ceramic can be easily controlled to 1.5 µm or less by controlling the manufacturing conditions, such as the specific surface area of the Ti compound, the calcination temperature, and the firing temperature, in combination with the composition range described above.

Next, an embodiment will be described with reference to a method for manufacturing the laminate type semiconductor ceramic capacitor.

First, a Sr compound such as $SrCO_3$, donor compounds containing a donor element such as La or Sm, and a fine Ti compound such as $TiO_2$, for example, with a specific surface area of 10 $m^2/g$ or more (average grain size: about 0.1 µm or less) are each prepared as ceramic raw materials, and weighed in predetermined amounts.

Then, these weighed materials with a predetermined amount (for example, 1 to 3 parts by weight) of dispersant added thereto is put into a ball mill along with a grinding medium such as PSZ (Partially Stabilized Zirconia) balls and pure water, and subjected to sufficient wet mixing in the ball mill to prepare a slurry.

The slurry is subjected to evaporative drying, and then to a calcination treatment at a predetermined temperature (for example, 1250° C. to 1400° C.) for about 2 hours in the atmosphere to obtain a calcined powder with the donor elements present as a solid solution.

A low melting point oxide such as $SiO_2$ is weighed so that the molar content of the low melting point oxide is 0 to 0.1 mol with respect to 100 mol of the Ti element, and further, an acceptor compound is weighed so that the molar content of the acceptor element such as Mn or Co is 0.5 mol or less (preferably, 0.3 mol to 0.5 mol) with respect to 100 mol of the Ti element. Then, the low melting point oxide and the acceptor compound, with the calcined powder and pure water, as well as a dispersant, if necessary, added thereto, are put again into a ball mill along with the grinding medium, and mixed sufficiently in a wet way in the ball mill. The mixture is thereafter subjected to evaporative drying, and to a heat treatment at a predetermined temperature (for example, 500° C. to 700° C.) for about 5 hours in the atmosphere to prepare a thermally treated powder.

Next, this thermally treated powder, with an organic solvent such as alcohol, an organic binder, an antifoamer, a surface modifier, etc. added appropriately, is mixed sufficiently in a wet way, to thereby providing a ceramic slurry.

The ceramic slurry is subjected to shape forming with the use of a shape forming method such as a doctor blade method, a lip coater method, or a die coater method, to prepare ceramic green sheets so that the thickness after firing is a predetermined value (for example, on the order of 1 µm to 2 µm).

Then, a conductive paste for internal electrodes is applied onto the ceramic green sheets with a transfer method such as a screen printing method, a gravure printing method, a vacuum deposition method, or a sputtering method, thereby forming a conductive film in a predetermined pattern on the surfaces of the ceramic green sheets.

It is to be noted that while the conductive material contained in the conductive paste for internal electrodes is not to be considered particularly limited, it is preferable to use a base material such as Ni and Cu, which has favorable electrical conductivity.

Then, the multiple ceramic green sheets with the conductive films formed thereon are stacked in a predetermined direction, with stacked ceramic green sheets for outer layers having no conductive films thereon and then subjected to pressure bonding, and cut into a predetermined size to prepare a laminate.

The laminate is thereafter subjected to a treatment for the removal of the binder at a temperature of 300° C. to 500° C. for about 2 hours in the atmosphere. Then, a reducing atmosphere is established in a firing furnace so as to have a predetermined flow ratio between $H_2$ gas and $N_2$ gas (for example, $H_2/N_2=0.025/100$ to $1/100$), and primary firing at a temperature of 1200° C. to 1250° C. for about 2 hours in the firing furnace is effected, thereby bring the laminate into a semiconductor condition.

When the calcination temperature (1250° C. to 1400° C.) in the calcination treatment is made higher than the firing temperature (1200° C. to 1250° C.) in the primary firing treatment as described above, crystal grain growth is hardly promoted in the primary firing treatment, so that the crystal grains can be prevented from coarsening. Furthermore, the calcination treatment can be controlled during the preparation of the calcined powder so that the crystal grains have an average grain size of 1.5 µm or less.

It is to be noted that when it is desired that the average grain size for the crystal grains be increased in the range of 1.5 µm or less during the primary firing treatment, the increased average grain size can be achieved by setting the firing temperature for the primary firing treatment to higher temperatures within the range of 1200° C. to 1250° C.

In addition, even when the firing temperature for the primary firing treatment is made higher than the calcination temperature, the average grain size for the crystal grains can be reduced to 1.5 µm or less by bringing the both temperatures close to each other as much as possible.

After the laminate is brought into a semiconductor condition, the semiconductor is subjected to secondary firing at a low temperature of 600° C. to 900° C. for about 1 hour in a weakly reducing atmosphere, in the atmosphere, or in an oxidizing atmosphere so that the internal electrode material such as Ni and Cu is not oxidized. Then, the semiconductor ceramic is subjected to reoxidation to form a grain boundary insulating layer, thereby preparing the component body 1 composed of a laminated sintered body with the internal electrodes 2 buried therein.

Next, a conductive paste for external electrodes is applied onto both ends of the component body 1, and subjected to a firing treatment to form the external electrodes 3a and 3b, thereby producing a laminate type semiconductor ceramic capacitor.

It is to be noted that as a method for forming external electrodes 3a and 3b, they may be formed by printing, vacuum deposition, sputtering, or the like. In addition, the conductive paste for external electrodes may be applied onto the both ends of the unfired laminate, and then subjected to a firing treatment at the same time as the laminate.

While the conductive material contained in the conductive paste for external electrodes is also not to be considered particularly limited, it is preferable to use a material such as Ga, In, Ni, and Cu, and further, it is also possible to form an Ag electrode on these electrodes.

In the present embodiment described above, the semiconductor ceramic forming the semiconductor ceramic layers 1a to 1g has a compounding molar ratio m between the Sr site and the Ti site of $0.990 \leq m < 1.000$, has a donor element such as La, Nd, Sm, Dy, Nb, and Ta present as a solid solution in the crystal grains, has an acceptor element such as Mn, Co, Ni, and Cr present in the grain boundary layer in the range of 0.5 mol or less (preferably 0.3 mol to 0.5 mol) with respect to 100 mol of the Ti element, and has crystal grains with an average grain size of 1.5 µm or less. Thus, a laminate type semiconductor ceramic capacitor with a varistor function can be achieved which is able to ensure insulation performance that can withstand practical use adequately, and moreover allows for an improvement in product yield, and is suitable for mass production with a favorable ESD withstanding voltage.

Specifically, the present embodiment allows a laminate type semiconductor ceramic capacitor to be achieved which has an ESD withstanding voltage of 30 kV or more, can ensure an insulation resistance log IR of 8.0 or more, has a product yield of 85% or more, and is suitable for mass production with favorable reliability, even when the capacitance is reduced to on the order of 1 nF.

It is to be noted that the present invention is not to be limited to the embodiment described above. For example, while the solid solution is prepared by a solid phase method in the present embodiment, the method for preparing the solid solution is not to be considered particularly limited, and any methods can be used, such as, for example, a hydrothermal synthesis method, a sol-gel method, a hydrolysis method, and a coprecipitation method.

Next, an example of the present invention will be specifically described.

Example

Preparation of Samples $SrCO_3$ and $TiO_2$ with a specific surface area of 30 m$^2$/g (average grain size: about 30 nm) were prepared as ceramic raw materials, and $LaCl_3$, $SmCl_3$, $NdCl_3$, and $DyCl_3$ were prepared as donor compounds. The donor compounds were weighed so as to provide the contents of the donor elements shown in Table 1 with respect to 100 mol of the Ti element, and further, $SrCO_3$ and $TiO_2$ were weighed so as to provide the compounding molar ratio m between the Sr site and the Ti site (=Sr site/Ti site) shown in Table 1. Then, 100 parts by weight of these weighed materials with 3 parts by weight of ammonium polycarboxylate added as a dispersant was put along with PSZ balls of 2 mm in diameter as a grinding medium and pure water into a ball mill, and subjected to wet mixing for 16 hours in the ball mill to prepare a slurry.

Next, this slurry was subjected to evaporative drying, and then to a calcination treatment at a temperature of 1350° C. for 2 hours in the atmosphere to obtain a calcined powder with the donor elements present as a solid solution in crystal grains.

To the calcined powder, $MnCO_3$ was added so as to provide a content of the Mn element shown in Table 1 with respect to 100 mol of the Ti element, and further, tetraethoxy silane $(Si(OC_2H_5)_4)$ was added so that the molar content of $SiO_2$ was 0.1 mol with respect to 100 mol of the Ti element, and further, the dispersant was added so that the content of the dispersant was 1 weight %. The calcined powder with $MnCO_3$, tetraethoxy silane, and the dispersant added was then put again into a ball mill along with PSZ balls of 2 mm in diameter and pure water, and subjected to wet mixing for 16 hours in the ball mill. It is to be noted that a $MnCl_2$ aqueous solution or a $MnO_2$ sol may be used in place of the $MnCO_3$, whereas a $SiO_2$ sol may be used in place of the tetraethoxy silane $(Si(OC_2H_5)_4)$.

The mixture was thereafter subjected to evaporative drying, and to a heat treatment at 600° C. for 5 hours in the atmosphere to obtain a thermally treated powder.

Next, the thermally treated powder with an organic solvent such as toluene or alcohol and a dispersant added in appropriate amounts was put again along with PSZ balls of 2 mm in diameter into a ball mill, and wet mixed for 16 hours in the ball mill. Then, the mixture with polyvinyl butyral (PVB) as an organic binder, dioctyl phthalate (DOP) as a plasticizer, and further a cationic surfactant added thereto in appropriate amounts was then subjected to a wet mixing treatment for 1.5 hours, thereby preparing a ceramic slurry.

Next, this ceramic slurry was subjected to shape forming by the lip coater method to prepare ceramic green sheets, and then, a conductive paste for internal electrodes, containing Ni as its main constituent, was applied by screen printing onto the ceramic green sheets, thereby forming a conductive film in a predetermined pattern on the surfaces of the ceramic green sheets.

Then, the multiple ceramic green sheets with the conductive films formed thereon were stacked in a predetermined direction, with stacked ceramic green sheets with no conductive films formed thereon as outer layers, and subjected to thermocompression bonding so as to provide a thickness on the order of 0.7 mm, forming a laminate of the ceramic green sheets and internal electrodes stacked alternately.

The laminate was thereafter subjected to a treatment for the removal of the binder at a temperature of 375° C. for 2 hours in a nitrogen atmosphere, and then to primary firing at a temperature of 1250° C. for 2 hours in a reducing atmosphere at a flow ratio adjusted to $H_2:N_2=1:100$, thereby bringing the laminate into a semiconductor state. It is to be noted that the firing temperature was set at a temperature leading to the maximum CR product for each sample.

The semiconductor laminate was then subjected to a reoxidation treatment by carrying out secondary firing at a temperature of 700° C. for 1 hour in the atmosphere, and the end surfaces were then polished to prepare a component body (laminated sintered body). Then, sputtering was applied to both end surfaces of the component body to form external electrodes of three-layer structure composed of a Ni—Cr layer, a Ni—Cu layer, and an Ag layer. Electrolytic plating was applied to form a Ni film and a Sn film sequentially on the surfaces of the external electrodes, thereby preparing samples of sample numbers 1 to 17. It is to be noted that the obtained respective samples had external dimensions of length L: 1.0 mm, width W: 0.5 mm, and thickness T: 0.5 mm, and had 10 layers as for the number of layers stacked.

Evaluations of Samples

The respective samples of sample numbers 1 to 17 were observed under a scanning electron microscope (SEM) to carry out image analyses of SEM photographs for surfaces or fracture surfaces of the samples, and thus obtain average grain sizes (average crystal grain sizes) for crystal grains.

In addition, an impedance analyzer (HP4194A from Agilent Technologies Inc.) was used to measure the capacitance of each sample under the conditions of frequency: 1 kHz and voltage: 1 V.

Furthermore, the ESD withstanding voltage for each sample was measured in such a way that positive and negative voltages were each applied 10 times for contact discharge in accordance with IEC 61000-4-2 (International Standard) of the ESD immunity test standard.

In addition, a direct-current voltage of 50 V was applied to 100 samples of each sample number for 1 minute, and the insulation resistance (log IR) of the sample was measured from the leakage current to obtain an average value for the 100 samples. Furthermore, the number of the 100 samples of each sample number with an insulation resistance of 50 MΩ or more was counted to obtain the product yield (%).

Table 1 shows the compositions and measurement results for sample numbers 1 to 17.

TABLE 1

| Sample No. | Compounding Molar Ratio m | Donor Element Elemental Species | Donor Element Content (mol) | Acceptor Element Elemental Species | Acceptor Element Content (mol) | Average Crystal Grain Size (μm) | Capacitance (nF) | ESD Withstanding Voltage (kV) | Insulation Resistance log IR | Product Yield (%) |
|---|---|---|---|---|---|---|---|---|---|---|
| 1* | 1.020 | La | 0.8 | Mn | 0.3 | 0.62 | 1.05 | 30 or more | 8.9 | 58 |
| 2* | 1.010 | La | 0.8 | Mn | 0.3 | 0.59 | 1.13 | 30 or more | 8.7 | 61 |
| 3* | 1.005 | La | 0.8 | Mn | 0.3 | 0.80 | 1.18 | 30 or more | 9.1 | 56 |
| 4 | 0.998 | La | 0.8 | Mn | 0.3 | 0.98 | 1.15 | 30 or more | 8.5 | 85 |
| 5 | 0.995 | La | 0.8 | Mn | 0.3 | 0.99 | 1.18 | 30 or more | 8.3 | 91 |
| 6 | 0.993 | La | 0.8 | Mn | 0.3 | 1.02 | 1.13 | 30 or more | 8.4 | 88 |
| 7 | 0.990 | La | 0.8 | Mn | 0.3 | 1.05 | 1.05 | 30 or more | 8.1 | 87 |
| 8* | 0.985 | La | 0.8 | Mn | 0.3 | 1.68 | 0.97 | 20 | 7.1 | 48 |
| 9 | 0.995 | La | 0.2 | Mn | 0.3 | 1.28 | 1.03 | 30 or more | 8.0 | 90 |
| 10 | 0.995 | La | 0.4 | Mn | 0.3 | 1.05 | 1.06 | 30 or more | 8.2 | 92 |
| 11 | 0.995 | La | 1.2 | Mn | 0.3 | 0.98 | 1.26 | 30 or more | 8.7 | 94 |
| 12 | 0.995 | Sm | 0.8 | Mn | 0.3 | 0.97 | 1.19 | 30 or more | 8.1 | 91 |
| 13 | 0.995 | Nd | 0.8 | Mn | 0.3 | 0.96 | 1.15 | 30 or more | 8.3 | 93 |
| 14 | 0.995 | Dy | 0.8 | Mn | 0.3 | 0.98 | 1.11 | 30 or more | 8.0 | 92 |
| 15 | 0.995 | La | 0.8 | Mn | 0.1 | 0.96 | 1.01 | 30 or more | 8.0 | 89 |

TABLE 1-continued

| Sample No. | Compounding Molar Ratio m | Donor Element Elemental Species | Donor Element Content (mol) | Acceptor Element Elemental Species | Acceptor Element Content (mol) | Average Crystal Grain Size (μm) | Capacitance (nF) | ESD Withstanding Voltage (kV) | Insulation Resistance log IR | Product Yield (%) |
|---|---|---|---|---|---|---|---|---|---|---|
| 16 | 0.995 | La | 0.8 | Mn | 0.5 | 1.01 | 1.23 | 30 or more | 8.6 | 90 |
| 17* | 0.995 | La | 0.8 | Mn | 0.7 | 1.43 | 1.34 | 10 | 8.8 | 86 |

*outside the scope of the present invention

Sample number 1 which is Sr site rich with a compounding molar ratio m of 1.020 provided a favorable insulation resistance log IR (average value) of 8.9, but provided a low product yield of 58%.

Sample number 2, also Sr site rich with a compounding molar ratio m of 1.010, provided a favorable insulation resistance log IR (average value) of 8.7, but provided a low product yield of 61%.

Sample number 3, which is also Sr site rich with a compounding molar ratio m of 1.005, provided a favorable insulation resistance log IR (average value) of 9.1, but provided a low product yield of 56%.

Sample number 8 was excessively rich in Ti site with a compounding molar ratio m of 0.985 but had coarsening to an average crystal grain size of 1.68 μm. For this reason, sample number 8 had a decrease in insulation resistance log IR (average value) to 7.1, and it also provided a low product yield of 48%. In addition, the ESD withstanding voltage was decreased to 20 kV.

Sample number 17 having a compounding molar ratio m of 0.995 showed a significant decrease in ESD withstanding voltage to 10 kV, because of the excessive content of Mn as the acceptor element, i.e., 0.7 mol with respect to 100 mol of Ti.

In contrast, the compounding molar ratio m ranges between 0.990 and 0.998 in the case of sample numbers 4 to 7 and 9 to 16, the content of Mn as the acceptor element ranges between 0.1 and 0.5 with respect to 100 mol of Ti, and the average crystal grain size ranges between 0.96 and 1.50, all within the scope of the present invention. Thus, it has been found that a desired laminate type semiconductor ceramic capacitor can be achieved which is able to ensure such insulation performance that can withstand practical use adequately even with the insulation resistance log IR slightly decreased to 8.0 to 8.7 as compared with sample numbers 1 to 3, and moreover, which has a dramatically improved product yield of 85% to 94%, and was suitable for mass production with an ESD withstanding voltage of 30 kV or more, while the capacitance is low between 1.01 nF and 1.26 nF.

INDUSTRIAL APPLICABILITY

A laminate type semiconductor ceramic capacitor with a varistor function can be achieved which allows for an improvement in product yield while ensuring such insulation performance that can withstand practical use, and is suitable for mass production with a favorable ESD withstanding voltage.

What is claimed is:

1. A laminate semiconductor ceramic capacitor with a varistor function comprising: a laminated sintered body of alternately stacked and fired plurality of semiconductor ceramic layers of a SrTiO₃ based grain boundary insulated semiconductor ceramic and a plurality of internal electrode layers; and external electrodes on ends of the laminated sintered body, the external electrodes being electrically connected to the internal electrode layers, wherein the semiconductor ceramic has a compounding molar ratio m between the Sr site and the Ti site of 0.990≤m<1.000, has a donor element present as a solid solution in crystal grains, has an acceptor element present in a grain boundary layer in the range of 0.5 mol or less (excluding 0 mol) with respect to 100 mol of the Ti element, and has crystal grains with an average grain size of 1.5 μm or less, and there is no acceptor element in solid solution in the crystal grains.

2. The laminate semiconductor ceramic capacitor with a varistor function according to claim 1, wherein the amount of the acceptor element is in the range of 0.3 mol to 0.5 mol with respect to 100 mol of the Ti element.

3. The laminate semiconductor ceramic capacitor with a varistor function according to claim 2, wherein the acceptor element is at least one element selected from the group consisting of Mn, Co, Ni, and Cr.

4. The laminate semiconductor ceramic capacitor with a varistor function according to claim 3, wherein the amount of the donor element is 0.2 mol to 1.2 mol with respect to 100 mol of the Ti element.

5. The laminate semiconductor ceramic capacitor with a varistor function according to claim 4, wherein the donor element is at least one element selected from the group consisting of La, Nd, Sm, Dy, Nb, and Ta.

6. The laminate semiconductor ceramic capacitor with a varistor function according to claim 5, wherein the semiconductor ceramic contains an amount of a low melting point oxide in the range of 0.1 mol or less with respect to 100 mol of the Ti element.

7. The laminate semiconductor ceramic capacitor with a varistor function according to claim 6, wherein the low melting point oxide comprises $SiO_2$.

8. The laminate semiconductor ceramic capacitor with a varistor function according to claim 7, wherein the donor element is La, the acceptor element is Mn, and the average grain size is 1.28 μm or less.

9. The laminate semiconductor ceramic capacitor with a varistor function according to claim 8, wherein the amount of the donor element is 0.4 mol to 1.0 mol with respect to 100 mol of the Ti element.

10. The laminate semiconductor ceramic capacitor with a varistor function according to claim 2, wherein the acceptor element is La, and the average grain size is 1.28 μm or less.

11. The laminate semiconductor ceramic capacitor with a varistor function according to claim 10, wherein the donor element is Mn.

12. The laminate semiconductor ceramic capacitor with a varistor function according to claim 2, wherein the amount of the donor element is 0.2 mol to 1.2 mol with respect to 100 mol of the Ti element.

13. The laminate semiconductor ceramic capacitor with a varistor function according to claim 12, wherein the amount of the donor element is 0.4 mol to 1.0 mol with respect to 100 mol of the Ti element.

14. The laminate semiconductor ceramic capacitor with a varistor function according to claim 13, wherein the low melting point oxide comprises $SiO_2$.

15. The laminate semiconductor ceramic capacitor with a varistor function according to claim 1, wherein the donor element is at least one element selected from the group consisting of La, Nd, Sm, Dy, Nb, and Ta.

16. The laminate semiconductor ceramic capacitor with a varistor function according to claim 15, wherein the semiconductor ceramic contains an amount of a low melting point oxide in the range of 0.1 mol or less with respect to 100 mol of the Ti element.

17. The laminate semiconductor ceramic capacitor with a varistor function according to claim 16, wherein the low melting point oxide comprises $SiO_2$.

18. The laminate semiconductor ceramic capacitor with a varistor function according to claim 1, wherein the semiconductor ceramic contains an amount of a low melting point oxide in the range of 0.1 mol or less with respect to 100 mol of the Ti element.

19. The laminate semiconductor ceramic capacitor with a varistor function according to claim 1, wherein the amount of the donor element is 0.2 mol to 1.2 mol with respect to 100 mol of the Ti element.

20. The laminate semiconductor ceramic capacitor with a varistor function according to claim 19, wherein the amount of the donor element is 0.2 mol to 1.2 mol with respect to 100 mol of the Ti element.

\* \* \* \* \*